April 28, 1936.  R. BERINGER  2,038,981

CLUTCH OPERATING MECHANISM

Filed Dec. 10, 1934  3 Sheets-Sheet 1

Inventor
Roscoe Beringer
By Blackmore, Spencer & Flint
Attorneys

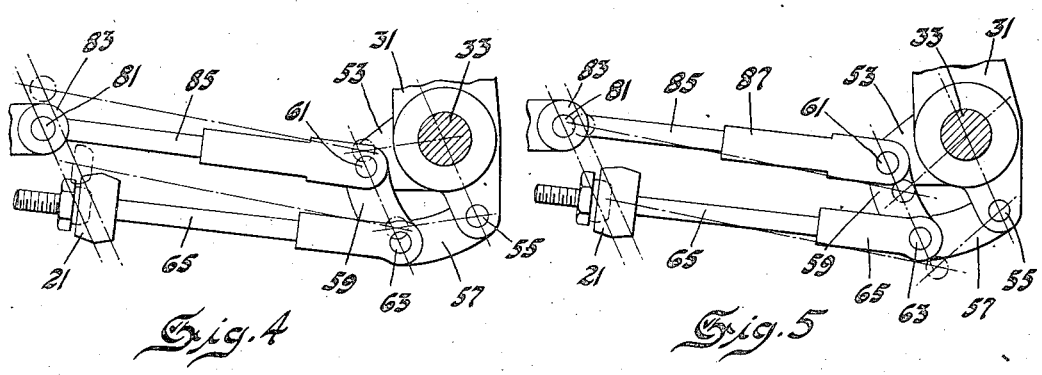
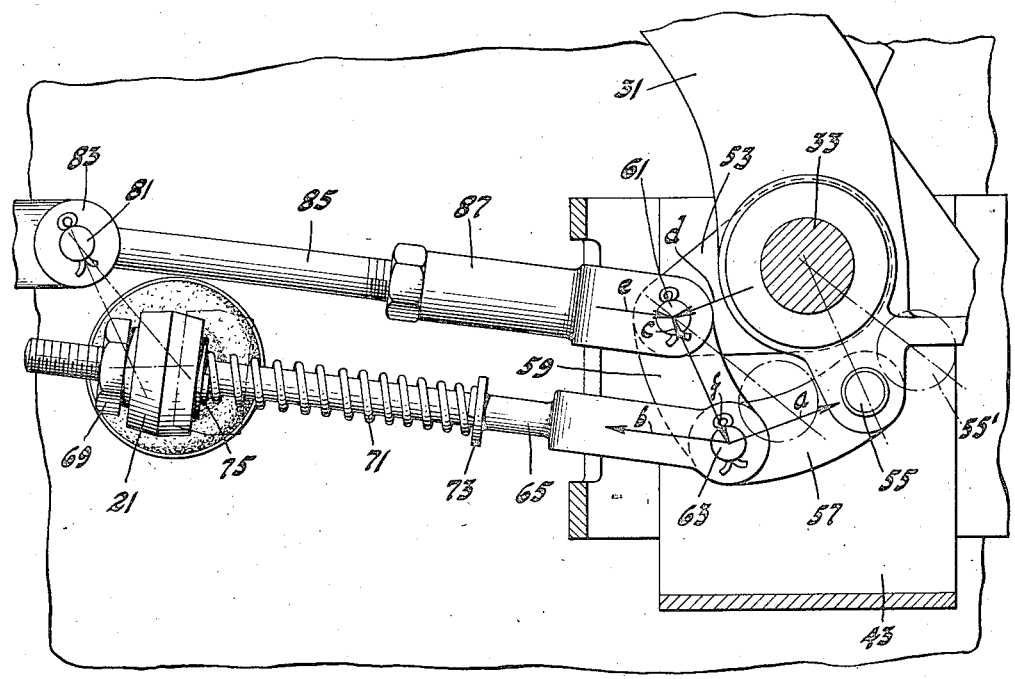

Patented Apr. 28, 1936

2,038,981

UNITED STATES PATENT OFFICE 2,038,981

CLUTCH OPERATING MECHANISM

Roscoe Beringer, Detroit, Mich., assignor to General Motors Corporation, Detroit, Mich., a corporation of Delaware Application December 10, 1934, Serial No. 756,769

6 Claims. (Cl. 180—64)

This invention relates to clutches and more particularly to the mechanism for releasing the clutch associated with the engine of a motor vehicle.

It is common practice to mount the motor vehicle power plant on the frame by a cushioning support such as rubber. This prevents the bodily fore and aft movement of the engine and its rotary movement about its axis of oscillation from being directly communicated to the chassis frame, and to the body supported thereon. Since the clutch housing is usually made rigid with the engine, this housing and the throwout lever projecting therefrom partake of the movements of the engine. The manually operated clutch releasing pedal is pivoted to the body or to the frame which supports the body. In consequence, the movements of the engine and clutch housing tend to cause a movement of the pedal if there be used the conventional operating connection between the pedal and the throwout lever. If the operator is in the act of exerting pressure on the pedal the engine motion instead of producing actual pedal movement reacts upon the pivoted throwout lever and tends to produce clutch chatter.

The object of this invention is to prevent clutch chatter resulting from the use of a cushioning engine support.

A further object is to provide a connection between the clutch release pedal and the clutch throwout mechanism, which connection shall permit free movements of the engine relative to the frame without causing movement of the clutch pedal and without producing clutch chatter.

A further object is to provide a connection as stated above wherein every movement of the release pedal shall be effective to move the throwout mechanism regardless of the movements of the engine relative to the frame.

Other objects and advantages will be understood from the following description.

In the drawings accompanying this description:

Figs. 4 and 5 are diagrammatic views showing the effect of engine movements upon the connecting means.

Fig. 6 is a view in side elevation intending to show diagrammatically how the pedal may release the clutch without moving the power plant even though the latter is cushioned with soft rubber.

Figure 1:
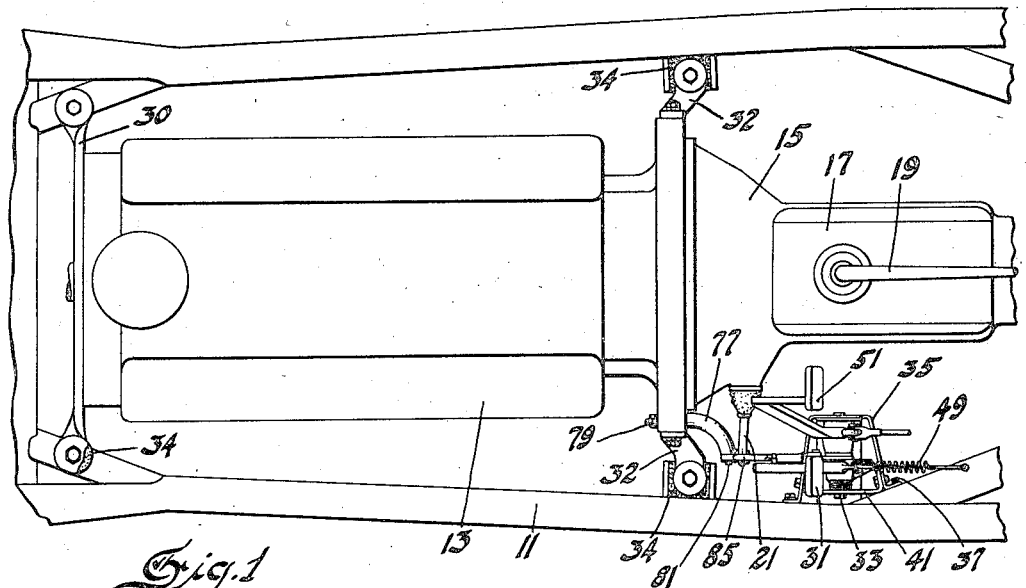
Fig. 1 is a top plan view of a motor vehicle frame including the engine and clutch housing and with my improved device applied.

Referring by reference characters to the drawings, numeral 11 designates the chassis frame of a motor vehicle and 13 is the engine. Rigid with the engine is a clutch housing 15 and a transmission housing 17.

Projecting from the latter is the conventional shift lever 19, and extending horizontally from the clutch housing is the usual pivoted clutch throwout lever 21, the fulcrum being represented by numeral 20. From Fig. 3 it will be seen that the throwout action of lever 21 pushes against a throwout bearing 23 and moves it axially of the drive shaft 25. This movement rocks a plurality of fingers one of which appears at 27, which fingers serve to separate suitable driving members from the driven plate or plates marked 29, these plates being carried by a hub splined on the driven shaft 25.

The engine is supported on the frame by means of arms 30 at the front end and 32 at the rear end. These arms are not in metal to metal contact with the frame but are supported by any preferred form of cushion. Such a cushion is shown in the drawings as of rubber and designated by numeral 34. This rubber cushion may be quite soft so that the engine has considerable freedom of movement relative to the frame. The freedom of movement is such that the power unit may rock about its normal axis of oscillation and may also move forward and backward relative to the frame.

Figure 3:
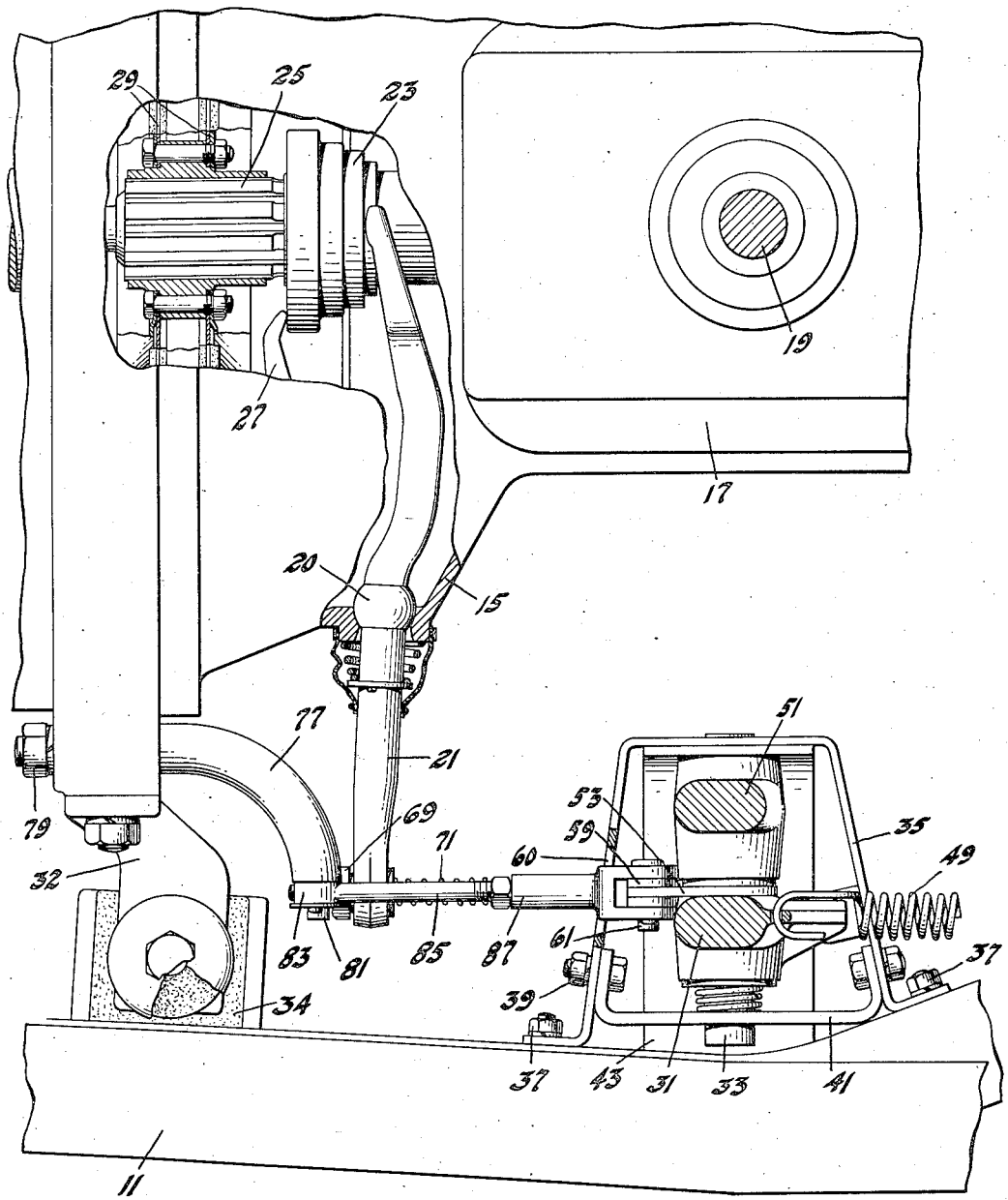
Fig. 3 is a top plan view on a larger scale and showing the clutch housing partly broken away.

The clutch releasing lever or pedal is marked 31. It rotates upon a supporting shaft 33. This shaft 33 is mounted on a frame 11. In Fig. 3 there is shown a somewhat U-shaped bracket 35 secured to the frame by fastening means 37. Fastening means 39 secure to the arm of bracket 35 a bearing yoke 41, and the shaft 33 is supported on the inner portion of the bracket and on the yoke as shown on the drawings. If desired, a stiffening plate 43 may also be used to add to the rigidity of the support. The bracket also carries an adjustable stop 45 normally engaged by a lug 47 on the lever 31 under the influence of a releasing spring 49 attached to the pedal and to the frame. The pivot shaft 33 also provides a rotatable support for a conventional brake pedal 51.

Rotatably mounted on shaft 33 between the clutch and brake pedals is a relatively short link 53. Pivoted at 55 on the lower end of pedal 31 is a link 57. Links 53 and 57 are connected by link means 59 terminally pivoted to links 53 and 57 at 61 and 63 as shown. Link means 59 are dimensioned to correspond with the distance between the center of shaft 33 and the pivot 55, the parts constituting a parallelogram, substantial parallelism being always maintained between the links 53 and 57. A connecting link 65 extends from pivot 63 through an opening 60 in bracket 35 and through an opening 67 in the end of throwout lever 21. On the end of link 65 is a threaded nut 69 having a spherical face to engage a similar face on the adjacent side of the throwout lever. As shown, there is an obtuse angle between the links 57 and 65. A spring 71 surrounds link 65 and engages an abutment 73 on the link at one end and a disc 75 adjacent the opening 67 of the link 21. This spring serves to keep the spherical faces on the nut 69 and the throwout lever 21 in noiseless contact. The adjacent engine frame arm 32 has secured thereto a secondary arm 77 by fastening means 79. A stud 81 on the end of arm 77 rotatably supports an eye 83 on the end of a link 85. This link 85 is connected to an extension yoke 87, the latter pivoted to the pin 61. The link 85 substantially parallels link 65 (as shown), the construction forming a second parallelogram linkage.

Figure 2:
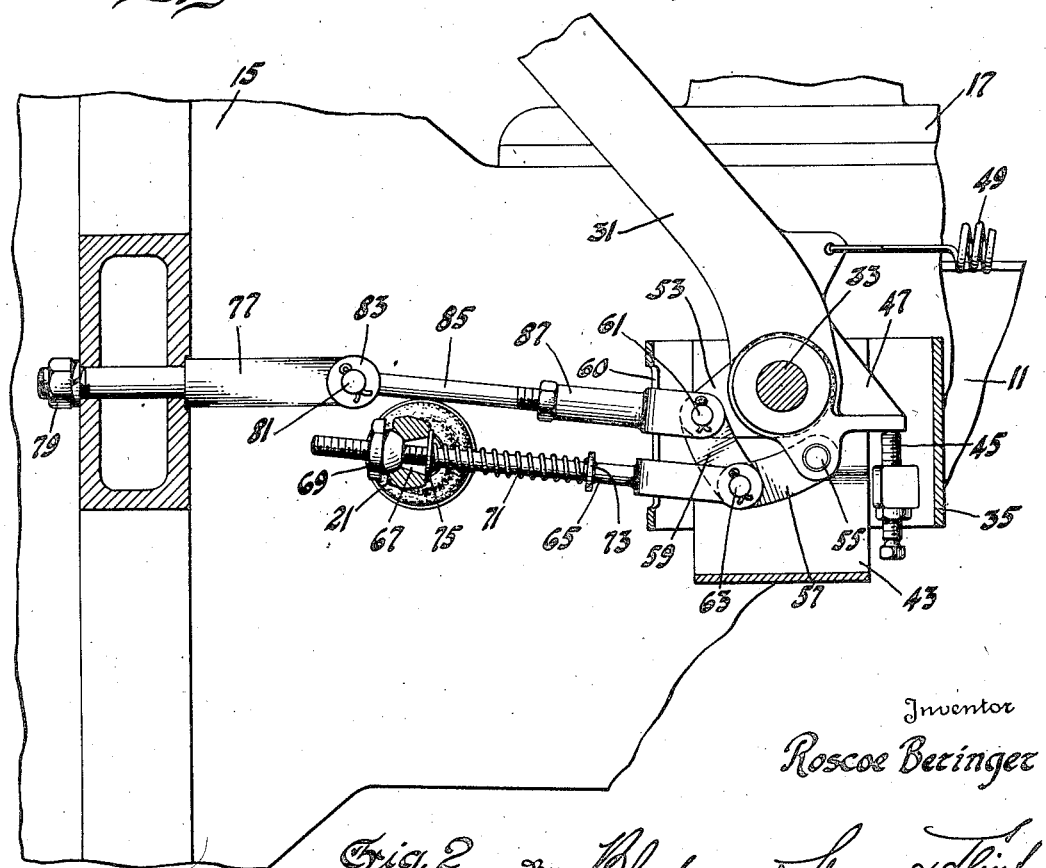
Fig. 2 is a side elevation of the novel connection between the release pedal and the clutch throwout mechanism.

The operation of the clutch releasing mechanism is as follows: Fig. 2 shows the parts in the normal clutch engaged position, the spring 49 holding the lug 47 on the stop 45. To release the clutch the pedal 31 is rocked in a counterclockwise direction. Pivot 55 thereupon moves toward a position marked 55' in Fig. 6, causing link 57 to be pulled toward the right. The conventional clutch spring (not shown) resists a bodily axial movement of link 65 under the pull from link 57. Also the mass of the engine resists a bodily movement of lever 21 and link 65. On Fig. 6 the arrow $a$ on link 57 and the arrow $b$ on link 65 show how these links are tensioned in the act of pedal depression. The tension in these links tends to straighten them and to push link 59 upwardly as shown by the arrow marked $c$. The upward push through link 59 resulting from the tension in links 65 and 57 is resisted by a reaction resulting from compression in links 53 and 85 as shown by arrows $d$ and $e$. The forces acting through link 59 from the tension in links 65 and 57 and from the compression in links 85 and 53 are shown by the arrows $c$ and $f$ and are substantially equal and opposite. The point 61 may then be considered as fixed and the pedal pressure can, therefore, not move the engine no matter how soft may be the rubber supports. This result may be understood by stating that the pull exercised by the pedal through link 65 tending to move the engine rearwardly is balanced by the push acting through link 85 tending to push the engine forwardly. The whole effect of the pedal is therefore effective to rock the lever 21 and release the clutch, the linkage approaching the dotted line positions shown by Fig. 6.

Not only is the pedal operation free to rock the throwout lever without moving the motor but the motor is free to move as a result of other causes without affecting the position of the pedal. For example, in Fig. 4 there is shown by full and dotted lines a movement of the linkage resulting from a movement of the engine about its longitudinal axis of oscillation. It will be seen that the movement of the engine is accommodated by movements of links 65 and 85 retaining their parallel relation, the latter accommodated by a slight movement of the links 53 and 57, these too remaining parallel, the position of the pedal being unchanged. The oscillating movement referred to is the rocking of the engine about a longitudinal axis midway between the side members of the chassis. Since the points 83 and 75 are adjacent the chassis frame bars the movements of these points are substantially vertical, the horizontal component being negligible.

In Fig. 5 is illustrated the condition where the engine moves rearwardly on the frame. Here the links 65 and 85 move bodily to the rear, this movement being accompanied by a swinging of links 53 and 57 to accommodate the reduction in distance between the pedal axis 33 and the point 81 on the engine.

It is therefore evident that the movements of the engine cannot disturb the position of the pedal nor of the throwout lever and also that regardless of the movements of the engine every movement of the pedal is transmitted to the throwout lever with a negligible tendency to move the power plant.

I claim:

1. A chassis frame, a power plant including a clutch, yielding means to support said power plant on said frame, said clutch having a throwout lever pivoted thereto and projecting therefrom, a clutch release lever fulcrumed to said frame, linkage including two jointed links, said links being directly pivoted together at their adjacent ends, the remote ends of said links being connected to said throwout lever and clutch release lever, other links directly jointed at their adjacent ends and terminally pivoted to fixed points on said frame and power plant respectively, and link means connecting the jointed ends of the pairs of links.

2. A frame, a power plant mounted thereon and including a clutch throwout lever, a release lever fulcrumed on said frame, links pivoted to the release lever fulcrum and to said release lever, link means joining the other ends of said links to maintain them in parallel relation, and a second pair of parallel links connected directly to the jointed ends of the links of the first pair, one of the links of the second pair being connected at its remote end to the power plant and the other link of the second pair being connected to the throwout lever.

3. The invention defined by claim 2, obtuse angles being formed by the links of the first and second pairs at the ends of the link means.

4. The invention defined by claim 2, the several links occupying a common plane and the throwout lever extending at substantially right angles to said plane.

5. In a motor vehicle, a frame, a power plant including a clutch having an extending throwout lever mounted thereon, a release lever fulcrumed on said frame, links pivotally connected at their adjacent ends, the remote ends of the links being pivoted to the throwout lever and release lever, said links forming an obtuse angle and operating in tension to release the clutch, a second pair of compression links terminally connected at fixed points on said power plant and frame and pivotally connected together at their adjacent ends, the links of the second pair being parallel with the links of the first pair, and link means connecting the united ends of the links of the two pairs.

6. In a motor vehicle, a frame, a power plant mounted thereon, said power plant including a clutch having a fulcrumed throwout lever, a release lever fulcrumed on said frame, connections between said levers comprising a first and a second pair of links, the links of each pair being parallel, each link of the first pair being connected to a link of the second pair, and link means connected to the junctions of the links of the first and second pairs, the remote ends of the links of the first pair connected one to the release lever and the other to a fixed frame pivot, the remote ends of the second pair being connected one to the throwout lever and the other to a fixed power plant abutment.

ROSCOE BERINGER.